E. C. SHAW.
VEHICLE WHEEL RIM.
APPLICATION FILED FEB. 20, 1907.

906,167.

Patented Dec. 8, 1908.

WITNESSES:
Walter F. Thompson.
Oliver Williams.

INVENTOR
Edwin Coupland Shaw
BY Seward & Davis
ATTORNEY

UNITED STATES PATENT OFFICE.

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 906,167.    Specification of Letters Patent.    Patented Dec. 8, 1908.

Application filed February 20, 1907. Serial No. 358,461.

*To all whom it may concern:*

Be it known that I, EDWIN COUPLAND SHAW, a citizen of the United States, residing at the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims designed for use with tires of resilient materials, and more particularly to rims intended for use with tires adapted to be attached and removed at will.

I have described and claimed in a companion application Serial Number 294,831 filed January 6, 1906 an improved vehicle wheel rim having one tire flange permanently mounted on the channel-iron, an opposing tire flange mounted on a removable split ring, and means for securing locking engagement between the channel-iron and the removable ring.

The object of the invention described and claimed in the present application is to provide a useful modification of the means for securing locking engagement between the channel-iron and the flange-bearing removable ring. I accomplish this object by means of a hooked lug upon the under-side of one terminal of the split ring, a plain cored lug upon the under-side of the other terminal, a slot in the channel-iron adapted to receive said lugs, and a key adapted to pass through the cored lug and to lock it within the slot.

Figure 1:
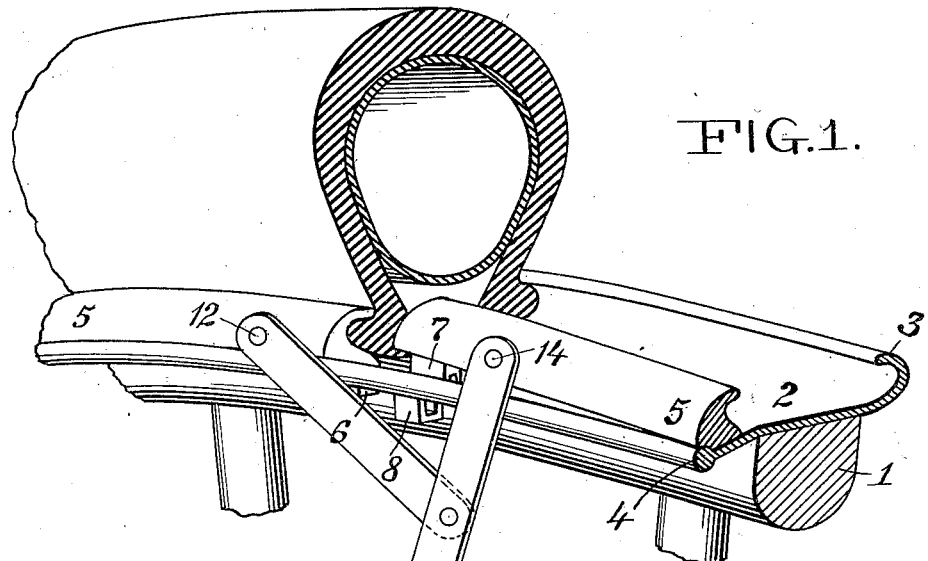
Figure 2:
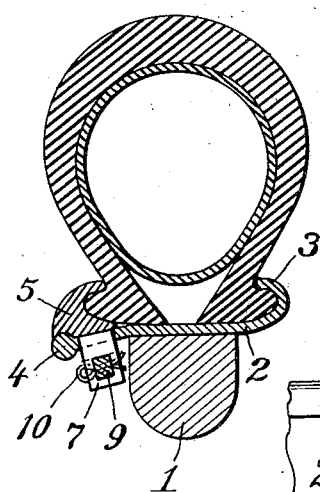
Figure 3:
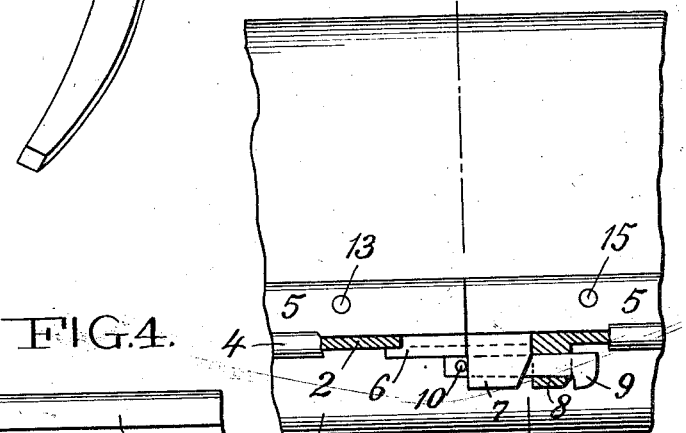
Figure 4:
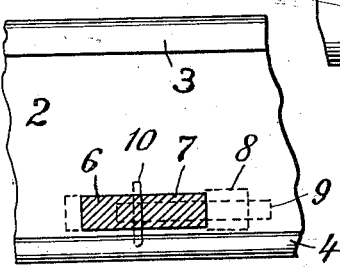
Figure 5:
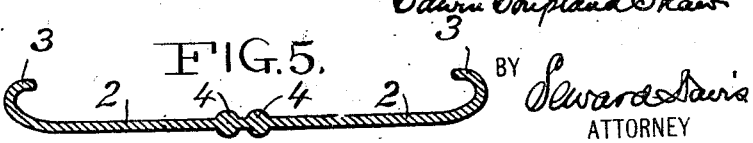

In the drawings Figure 1 is a perspective view showing a section of a tire and my improved means for securing the tire to the wheel felly. Fig. 2 is a cross-section of the tire and rim upon the broken line *x x* of Fig. 3 showing the means for securing the removable flange to the channel-iron. Fig. 3 is a side view of the tire and rim, a portion being broken away to show details of the locking means. Fig. 4 is a plan view of a section of the rim showing the configuration of the slot and in dotted lines the location of the lugs and key. Fig. 5 is a sectional view showing a form in which two of the channel-irons may be conveniently rolled in one operation.

I have shown my device as applied to the rim of a tire of the clencher type, in which the flanges are curved upwardly and inwardly to grasp and hold beads formed upon the tire casing, but it will be obvious to those skilled in the art that by altering the shape of the tire flanges my device can be adapted for use with tires of any desired form.

Referring to the drawings in Fig. 1, 1 is a wheel felly, the channel-iron 2 being adapted to be secured thereto by riveting or other suitable means. A tire flange 3 is formed upon or permanently fixed to the channel-iron and is designed to engage one edge of the tire or tire casing. At its other edge the channel-iron is inclined somewhat downwardly and terminates in an upwardly projecting flange or bead 4 adapted to form a seat for the removable member and to secure it from laterally outward displacement. The form of this portion of the rim may be varied considerably: for example, instead of the inclined portion there may be a downwardly disposed offset. The essential feature is that the upper line of the retaining flange or bead shall be on a level with or below the surface of the main portion of the channel-iron, so that a tire can be applied without stretching. The retaining bead 4 may likewise be of various forms providing only that it shall form a seat for the detachable member and secure it from laterally outward movement. I have shown in the drawings a form of channel-iron and retaining means which is desirable on account of economy of manufacture. Two sections of rim may be rolled from a single piece of metal in the shape shown in cross-section in Fig. 5, having two beads or ridges along its central portion. This section may then be split longitudinally along the line between two ridges, and two channel-irons are thus available.

The second tire flange is formed upon a removable transversely split ring 5 which comprises a tire flange and a base portion adapted to seat upon the extension of the rim and against the retaining bead 4. The form of the base portion is such that when the ring is in place the tire flange is in position to retain the tire and opposite to the flange 3. Upon the under-side of the terminals of this ring are the lugs 6 and 7, the form of which is more clearly shown in Figs. 2 and 3. The adjoining faces of the lugs are preferably flush with the faces of the split ring terminals, so that when the ends of the ring are drawn together, the faces of the ring ends and of the lugs contact in the same plane. The upper portion of the posterior face of the lug 6 is cut back into a recess having a vertical depth equal to the thickness of the channel-iron, and the lug is thus formed into a hook for the purpose which will hereinafter appear. The lug 7 is somewhat deeper than the lug 6, and is cored longitudinally at a point which is below the under-surface of the hooked lug when the ring terminals contact in alinement. At a convenient point upon its periphery the portion of the channel-iron which carries the removable ring is provided with a slot of the proper size and shape to admit the two lugs when in longitudinal alinement and to conform closely thereto. Extending downwardly from the channel-iron and adjoining the end of the slot which receives the cored lug is a lug or projection 8, preferably similar in shape to the cored lug, and this lug is likewise cored, the hole registering with the hole in the lug 7 when the latter is forced downward into the slot. A key 9 is provided, having a shaft fitted to the holes in the lugs 7 and 8 and preferably having a length such that when the head of the key is forced against the lug 9, the end of the key projects through the lug 7 and seats beneath the lug 6. The portion of this key which projects beyond the lug 7 may be drilled to receive a cotter pin or split key 10 for the purpose of retaining the key 9 in position.

The mode of operation of my device is as follows: To apply a tire the split ring is removed and the tire placed upon the rim and made to engage closely with the permanent tire flange 3 about the entire periphery. The lug 6 upon the split ring is then hooked into the slot and the ring sprung into place about the channel-iron inside the retaining flange or projection 4. The terminals of the ring are then pulled together, allowing the lug 7 to enter the slot. The key 9 is then forced through the lug 8 and the lug 7, its terminals seating beneath the lug 6, and the cotter pin 10 inserted in the hole provided for it. In this position the tire flange and the tire will be securely locked to the channel-iron. The bead 4 against which the ring 5 seats prevents the latter from laterally outward displacement, the hooked lug 6 engaging in the slot and beneath its edge secures one of the terminals of the ring in position, the key 9 passing through the lug 8 and the lug 7 secures the second terminal of the ring in position and the cotter pin 10 secures the key 9 against jarring loose.

If desired both tire flanges may be made detachable by simply duplicating the split ring and the attaching means, but in practice this is found to be both unnecessary and undesirable. Again, the flange-bearing removable ring may be constructed in two or more sections by providing similar locking means at the several joints and with large and heavy structures this may be found advisable.

The split ring is proportioned to fit accurately to its seat on the channel-iron, and it therefore may be found difficult in practice to pull the ring terminals into contact and to force the lug 7 into the slot. To facilitate this operation I provide the jointed lever 11 shown in Fig. 1. A pin 12 upon one arm of the lever is inserted in the hole 13 provided in the split ring near one terminal, and a pin 14 upon the other arm of the lever is inserted in the hole 15 in the ring near its other terminal. By means of the handle of the lever the second ring terminal can be pulled up into place and the lug easily slipped into the slot in the rim ready to be secured there by the key 9.

Having described my invention what I claim is:

1. In a vehicle wheel rim the combination of a channel-iron carrying one tire flange, a removable split ring carrying a second tire flange, a slot in said channel-iron, a downwardly extending hooked lug upon one terminal of the split ring, and a downwardly extending cored lug upon a second terminal of said split ring, a cored flange extending downwardly from the channel-iron, and a key adapted to pass through said cored lug and flange.

2. In a vehicle wheel rim the combination of a channel-iron carrying one tire flange, a transversely split ring carrying an opposing tire flange, downwardly extending lugs upon the terminals of said ring, a slot in said channel-iron adapted to receive said lug and means for securing said lugs within the slot comprising a hook upon one lug, a longitudinally disposed hole through the other lug, a downwardly extending lug upon the channel-iron provided with a hole registering with the hole in the second lug, and a key adapted to pass through the perforated lugs.

3. Means for locking a detachable cross split tire flange to the channel iron of a vehicle wheel rim comprising a hooked lug 6 upon one terminal, a cored lug 7 upon the other terminal, a slot in said channel iron adapted to receive said lugs, a cored lug 8 extending downwardly from the channel iron and a key 9 adapted to pass through the lugs 7 and 8 and to secure the lug 7 within said slot, substantially as described.

EDWIN COUPLAND SHAW.

Witnesses:
C. C. GOODWIN,
W. K. MEANS.